United States Patent
Putzolu

(10) Patent No.: US 6,584,509 B2
(45) Date of Patent: Jun. 24, 2003

(54) RECOGNIZING AUDIO AND VIDEO STREAMS OVER PPP LINKS IN THE ABSENCE OF AN ANNOUNCEMENT PROTOCOL

(75) Inventor: David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/103,625

(22) Filed: Jun. 23, 1998

(65) Prior Publication Data

US 2002/0007416 A1 Jan. 17, 2002

(51) Int. Cl.$^7$ .............................................. G06F 15/173
(52) U.S. Cl. .................................. 709/240; 370/395.42
(58) Field of Search ................................ 709/217, 207, 709/224, 228, 231, 232, 233, 236, 240; 714/47; 340/825; 370/252, 263, 351, 395.42, 471, 474, 476

(56) References Cited

U.S. PATENT DOCUMENTS 5,446,730 A * 8/1995 Lee et al. ...................... 370/54
5,539,744 A * 7/1996 Chu et al. ...................... 370/60

(List continued on next page.)

FOREIGN PATENT DOCUMENTS

| EP | 841831 | * | 5/1998 | ............ H04Q/11/04 |
| EP | 856981 | * | 8/1998 | ............ H04M/7/00 |
| EP | 917318 | * | 5/1999 | ............ H04L/12/46 |
| EP | 948165 A1 | * | 10/1999 | ............ H04L/12/26 |
| EP | 963082 | * | 12/1999 | ............ H04L/12/56 |
| GB | 2337906 | * | 12/1999 | ......... H04L/12/413 |

OTHER PUBLICATIONS

R. Braden, Ed., et al., "Resource Reservation Protocol (RSVP)—Version 1 Functional Specification," RFC 2205, Sep. 1997.
H. Schulzrinne, S. Casner, R. Frederick and V. Jacobson, "RTP: A Transport Protocol for Real–Time Applications," RFC 1889, Jan. 1996.
S. Casner, V. Jacobson, "Compressing IP/UDP/RTP Headers for Low–Speed Serial Links," Work in Progress (draft–ietf–avt–crtp–04.txt), Nov. 1997 (3/97).
C. Bormann, "The Multi–Class Extension to Multi–Link PPP," Work in Progress (draft–ietf–issll–isslow–mcml–03.txt) Mar. 1998 (5/97).
P. Ferguson, "Simple Differential Services: IP TOS and Precedence, Delay Indication, and Drop Preference," Work in Progress (draft–ferguson–delay–drop–00.txt), Nov. 1997.
S. Jackowski, "Network Element Service Specification for Low Speed Networks," Work in Progress (draft–ietf–issl–isslow–svcmap–01.txt), Nov. 1997.
M. Shreedhar, G. Varghese, "Efficient Fair Queuing Using Deficit Round–Robin," IEEE/ACM Trans. Networking, Jun. 1996.
Information Science Institute, University of Southern California, "Internet Protocol DARPA Internet Program Protocol Specification," Sep. 1981.
J. Postel, ISI, "User Datagram Protocol," Aug. 1980.

(List continued on next page.)

Primary Examiner—Bunjob Jaroenchonwanit
(74) Attorney, Agent, or Firm—Blakely, Sokoloff, Taylor & Zafman LLP

(57) ABSTRACT

Enhancing quality of network service for multimedia streams by recognizing audio and video packets over Point-to-Point Protocol links independent of the presence of announcement protocols comprises identifying multimedia packets from data streams and prioritizing each packet according to information that each packet carries.

16 Claims, 6 Drawing Sheets

U.S. PATENT DOCUMENTS

| | | | |
|---|---|---|---|
| 5,633,868 A | * 5/1997 | Baldwin et al. | 370/331 |
| 5,748,917 A | * 5/1998 | Krein et al. | 710/307 |
| 5,764,645 A | * 6/1998 | Bernet et al. | 370/466 |
| 5,768,527 A | * 6/1998 | Zhu et al. | 709/231 |
| 5,768,539 A | * 6/1998 | Metz et al. | 709/249 |
| 5,771,335 A | * 6/1998 | Lee | 386/111 |
| 5,790,792 A | * 8/1998 | Dudgeon et al. | 709/212 |
| 5,793,763 A | * 8/1998 | Mayes et al. | 370/389 |
| 5,812,534 A | * 9/1998 | Davis et al. | 370/260 |
| 5,822,524 A | * 10/1998 | Chen et al. | 709/203 |
| 5,852,721 A | * 12/1998 | Dillon et al. | 709/217 |
| 5,867,494 A | * 2/1999 | Krishnaswamy et al. | 370/352 |
| 5,887,191 A | * 3/1999 | Adiga et al. | 395/825 |
| 5,918,020 A | * 6/1999 | Blackard et al. | 709/228 |
| 5,920,568 A | * 7/1999 | Kurita et al. | 370/411 |
| 5,933,426 A | * 8/1999 | Motoori | 370/352 |
| 5,933,567 A | * 8/1999 | Lane et al. | 386/68 |
| 5,944,795 A | * 8/1999 | Civanlar | 709/227 |
| 5,946,045 A | * 8/1999 | Ozkan et al. | 348/467 |
| 5,963,560 A | * 10/1999 | Kalkunte | 370/448 |
| 5,987,022 A | * 11/1999 | Geiger et al. | 370/349 |
| 5,991,302 A | * 11/1999 | Berl et al. | 370/389 |
| 5,995,491 A | * 11/1999 | Richter et al. | 370/263 |
| 6,006,272 A | * 12/1999 | Aravamudan et al. | 709/245 |
| 6,038,214 A | * 3/2000 | Shionozaki | 370/230 |
| 6,041,054 A | * 3/2000 | Westberg | 370/389 |
| 6,078,953 A | * 6/2000 | Vaid et al. | 709/223 |
| 6,081,513 A | * 6/2000 | Roy | 370/260 |
| 6,085,252 A | * 7/2000 | Zhu et al. | 709/231 |
| 6,091,709 A | * 7/2000 | Harrison et al. | 370/235 |
| 6,138,163 A | * 10/2000 | Nam et al. | 709/231 |
| 6,141,686 A | * 10/2000 | Jackowski et al. | 709/105 |
| 6,172,990 B1 | * 1/2001 | Deb et al. | 370/474 |
| 6,181,713 B1 | * 1/2001 | Patki et al. | 370/474 |
| 6,185,184 B1 | * 2/2001 | Mattaway et al. | 370/352 |
| 6,185,229 B1 | * 2/2001 | Obikane et al. | 370/537 |
| 6,219,704 B1 | * 4/2001 | Kim et al. | 340/825.5 |
| 6,222,841 B1 | * 4/2001 | Taniguchi | 370/389 |
| 6,249,319 B1 | * 6/2001 | Post | 348/515 |
| 6,304,578 B1 | * 10/2001 | Fluss | 370/413 |
| 6,310,862 B1 | * 10/2001 | Roy | 370/260 |
| 6,337,856 B1 | * 1/2002 | Schanhals et al. | 370/352 |
| 6,359,656 B1 | * 3/2002 | Huckins | 348/460 |
| 6,459,682 B1 | * 10/2002 | Ellesson et al. | 370/235 |
| 2001/0009554 A1 | * 7/2001 | Katseff et al. | 370/466 |
| 2001/0037406 A1 | * 11/2001 | Philbrick et al. | 709/250 |
| 2001/0042114 A1 | * 11/2001 | Agraharam et al. | 709/223 |

OTHER PUBLICATIONS

C. Bormann, "PPP in a real–time oriented HDLC–Like framing," Internet–Draft (draft–ietf–issl–isslow–rtf–02.txt), Sep. 1998.

Aerde et al. "Development and potential of system optimized route guidance strategies", 1989, IEEE, pp. 304–309.*

Yang et al., "Determination of the optimum packet length and buffer sizes for the consumer electronics bus", 1992, IEEE, p. 884–894.*

Mohammad et al., "Performance analysis of combined free/Demand assignment multiple access (CFDAMA) protocol for packe satellite communications", 1994, IEEE, pp. 869–873.*

Zang et al., "Performance analysis of multiihop lightwave networks with hot potato routing and distance–age–priorities", 1994, IEEE, pp. 2571–2581.*

Tamboli et al., "Determination of the optimum packet length and buffer sizes for the industrial building automation and control networks", 1995, IEEE catalog No. 95TH8081, IEEEE, pp. 831–836.*

Ngoc et al., "Performance of combined free/Demand assignment multi–access (CFDAMA) protocol with pre–assigned request slots in integrated voice/data satellite communications", 1995, IEEE, 1572–1576.*

Ngoc et al., "Performance analysis of CFDAMA–PB protocol for packet satellite communications", 1998, IEEE, 1206–1214.*

Oida et al., "Characteristics of deterministic optimal routing for a simple traffic control problem", 1999, IEEE, pp. 386–392.*

Amir et al., "An application level video gateway"1995, ACM.ORG, 19 pages.*

Hardman et al., "Successful multiparty audio communication overr the Internet", May 1998, vol. 41, No. 5, Communication of th ACM, pp. 74–80.*

Keller et al., "XMovie: Architecture and Implementation of a Distributed Movie System", Oct. 1995, vol. 13, No. 4, ACM Transactions on Information Systems, pp. 471–499.*

* cited by examiner

RECOGNIZING AUDIO AND VIDEO STREAMS OVER PPP LINKS IN THE ABSENCE OF AN ANNOUNCEMENT PROTOCOL

BACKGROUND OF THE INVENTION

1. Field of the Invention

The present invention relates generally to the field of communication systems. More specifically, the present invention relates to recognizing audio and video streams over Point-to-Point Protocol ("PPP") links.

2. Description of the Related Art

With recent developments in the area of multimedia data processing in the Internet and the World Wide Web ("WWW") such as, speech, sound, and image processing, new techniques for managing and transferring multimedia data over communications networks are needed. In other words, a method to transfer multimedia packets over the communication networks with minimal delay is required to meet real time multimedia requirements.

In communication networks utilizing Internet protocol ("IP") (See reference: Information Science Institute, University of Southern California, "Internet Protocol DARPA Internet Program Protocol Specification", September 1981), real time multimedia data, such as audio and video ("AV") data, is typically transmitted using User Datagram Protocol ("UDP"). (See reference: J. Postel, ISI, "User Datagram Protocol", August 1980). UDP is referred to as an unreliable protocol because UDP normally makes no effort to re-transmit lost packets or to reorder the out of sequence packets during transmission.

High network utilization is one situation that may cause AV packets to reach their destination out of order, or with time delay, or occasionally some packets may fail to reach their destination. A highly utilized communication network may cause multimedia packets to wait for accessing PPP links. Consequently, waited packets often reach their destinations at a later time and sometimes, the arrival sequence of waited packets may be out of order.

When the amount of AV packet loss or out of order is not too severe, AV playback may be audible and viewable with minimum distortion. However, when the amount of AV packet loss or out of order is too severe, the result may be inaudible or confusing.

By contrast, Transmission Control Protocol (TCP), which also runs over IP, is a reliable protocol in which data packets are guaranteed to eventually reach their destinations. The packets which are transmitted using TCP, are numbered in sequence when first transmitted so that upon a retry or retransmission, the packets can be ordered correctly. However, the disadvantage of TCP is slowness, which is caused by the process of numbering packets in sequence and by multiple retransmission necessary to improve reliability. TCP is normally utilized for transferring text binary files and control messages, which do not ordinarily need real time transfer, but it is important that transmitted packets eventually be received intact and in order at their intended destinations.

When transporting streams of multimedia packets over the network, it is important for multimedia packets to be transmitted without delay since real time multimedia packets have tight latency and jitter requirements. However, these tight latency and jitter requirements are often violated when multimedia packets are transmitted across PPP links due to the low bandwidth typically available over such links. It is common for such low bandwidth PPP links to simultaneously be used for both multimedia, which may be carried by UDP, and data streams, which maybe carried by TCP. This scenario is often known as simultaneous AV and data "SAVD". SAVD often takes all available bandwidth by TCP streams resulting in delivery of audio/video streams with unacceptable levels of loss and jitter.

One way to minimize loss of multimedia packets and to enhance quality of services is to transport AV packets in a lightly loaded link (e.g., the user is not simultaneously browsing the WWW, downloading files by FTP, etc.). The disadvantage of this method is that if a PPP link is initially lightly loaded but subsequently loaded while transferring the multimedia packets, it will cause significant degradation in quality of service, especially for multimedia data.

Another way to improve the quality of service for multimedia streams is using announcement protocols. This option involves using a PPP link in conjunction with Compressed Real Time Protocols ("CRTP") (see reference: S. Casner, V. Jacobson, "Compressing IP/UDP/RTP Headers for Low-Speed Serial Links", Internet-Draft (draft-ietf-avt-crtp-04.txt), March 1997.) and Multi-Channel Multi-Links PPP ("MCML") (see reference: C. Bormann, "The Multi-Class Extension to Multi-Link PPP", Internet-Draft (draft-ietf-issll-isslow-mcml-03.txt), May 1997.) or Real Time Framing ("RTF") (see reference: C. Bormann, "PPP in a real-time oriented HDLC-Like framing", Internet-Draft (draft-ietf-issll-isslow-rtf-02.txt), September 1998.) along with an announcement protocol, such as RSVP. See reference: R. Braden, Ed., et. al.,"Resource Reservation Protocol (RSVP)—Version 1 Functional Specification", RFC 2205, September 1997. This method relies on announcement protocols to determine which stream requires more than best-effort service and what level and type of services to provide for such streams. Best-effort service is referred to a default quality of service that a conventional communication network offers. However, RSVP and other announcement protocols have not yet been widely deployed across intranet and Internet environments. Furthermore, announcement protocols require changes to applications to indicate the need for special treatment of the streams they transmit/receive.

Accordingly, it is desirable to have a mechanism that can recognize AV packets and is capable of enhancing the quality of service for AV packets using MCML or RTF over PPP links in the absence of announcement protocols.

SUMMARY OF THE INVENTION

A method and apparatus for enhancing quality of network service for multimedia streams over Point-to-Point Protocol ("PPP") links in the absence of announcement protocols are disclosed.

In one embodiment, a method for improving data communications based on the quality of service ("QOS") for multimedia streams over PPP links includes identifying audio and video packets from data streams independent of the presence of announcement protocols. The method further includes prioritizing packets to be transferred over the links according to information that each packet carries.

In another embodiment, an apparatus is designed to enhance QOS for multimedia frames over PPP links to recognize multimedia packets from incoming data frames in the absence of an announcement protocol. The apparatus further prioritizes the packets to be transmitted over the links in response to the information that each packet carries and subsequently transfers the priority classes along with associated packets over the links.

Additional features and benefits of the present invention will become apparent from the detailed description, figures and claims set forth below.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION

A method and an apparatus for enhancing quality of network service for multimedia streams by recognizing AV packets over PPP links that is independent of the presence of an announcement protocol is disclosed.

In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. An embodiment of the present invention, described below, enables a remote computer system user to transport information over a communication networks.

The present invention provides a method for enhancing network quality of service for multimedia streams by recognizing AV packets from incoming data streams that are being transmitted over PPP links in the absence of an announcement protocol. The method for improving data communications based on the quality of service for multimedia streams over PPP links comprises identifying AV packets from data streams without use of an announcement protocol such as RSVP. The method further comprises prioritizing packets according to the type of data to be transferred over the links.

Figure 1A:
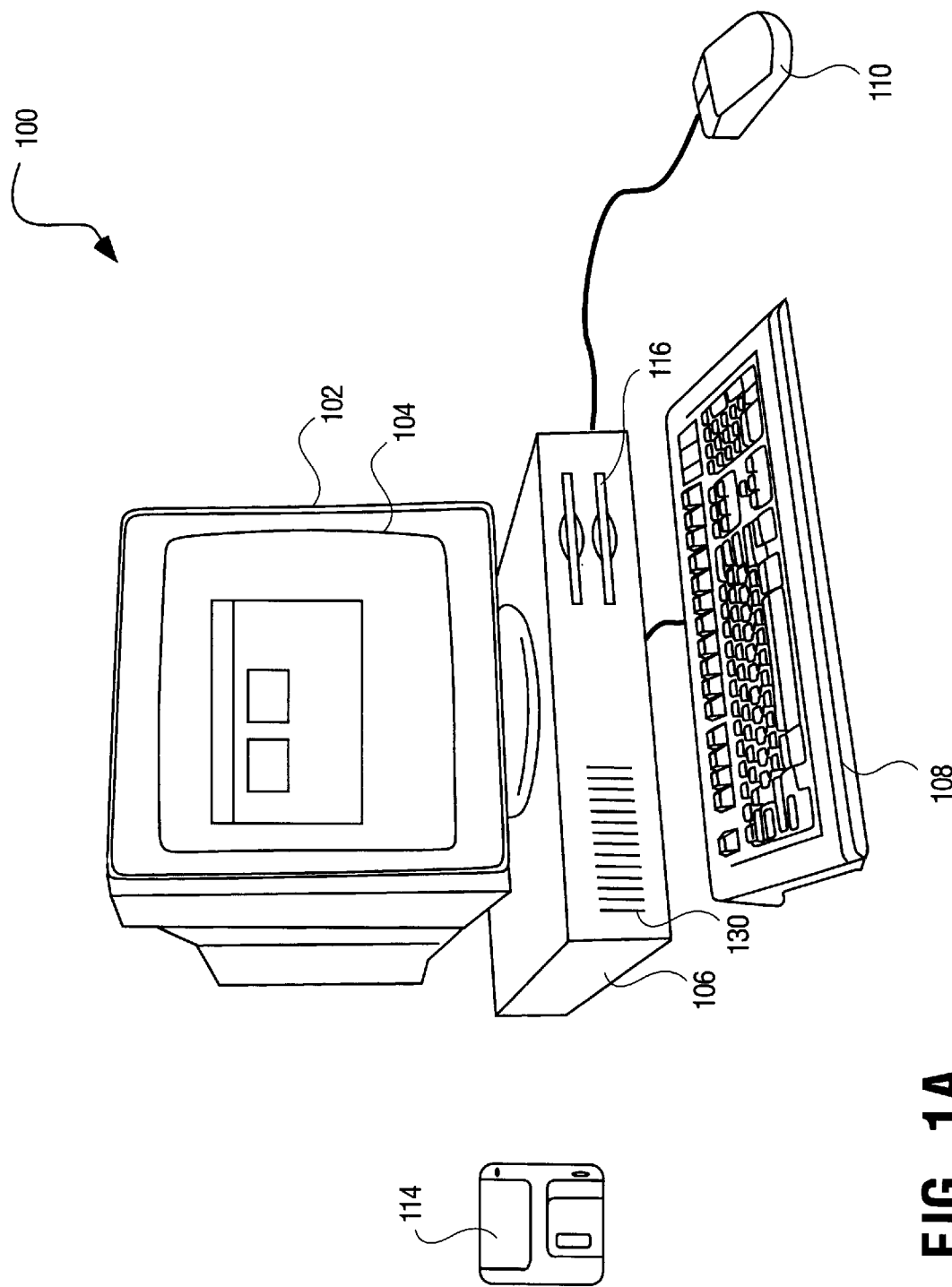
FIG. 1A illustrates a computer system diagram which shows a computer hardware for use of an embodiment of the present invention.

FIG. 1A shows a computer hardware environment that may be used with the present invention. The present invention may be implemented using a computer 100, wherein the computer 100 comprises a processor 106, random access memory (RAM) 130, and read-only memory (ROM) and/or other components. The computer 100 may be coupled to I/O devices, such as a monitor 102, keyboard 108, mouse device 110, fixed and/or removable data storage devices 114, and printer 118. The computer 100 could also be coupled to other I/O devices, including a local area network (LAN) or wide area network (WAN). Those of ordinary skill in the art will recognize that any combination of the above components, or any number of different components, peripherals, and other devices, may be used with the computer 100.

Figure 1B:
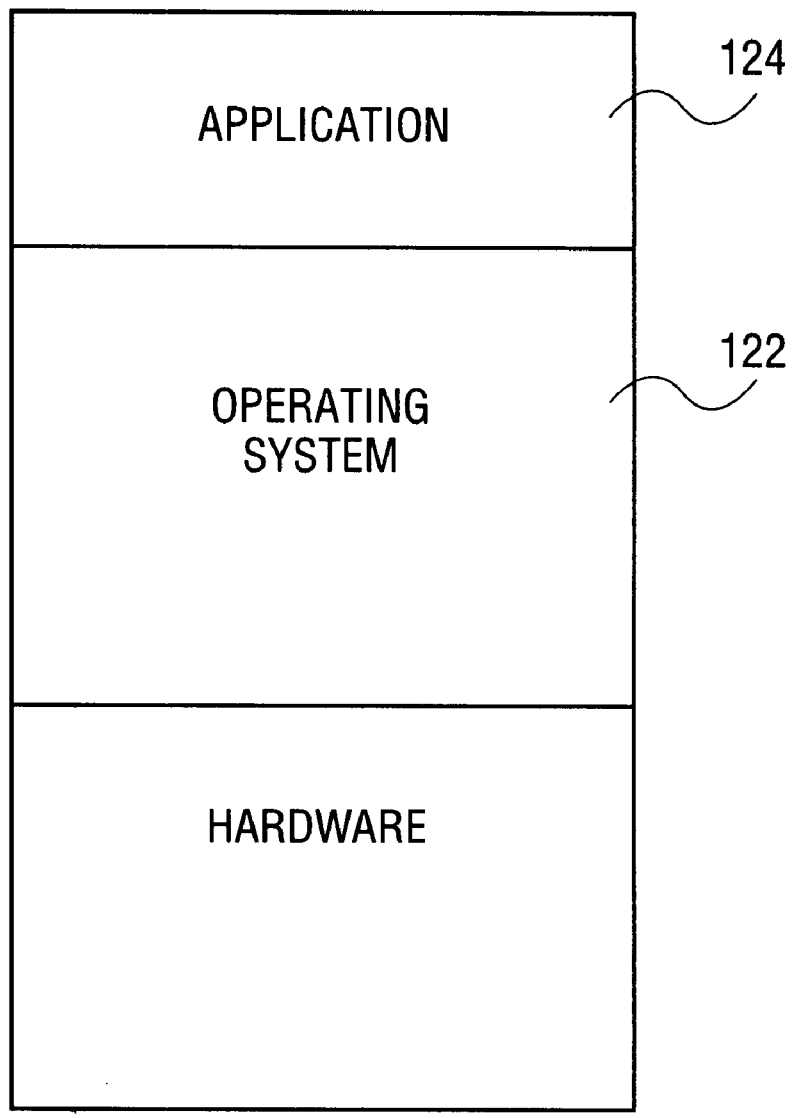
FIG. 1B illustrates a computer system diagram which shows operating system for use of an embodiment of the present invention.

FIG. 1B illustrates an operating system 122 that is situated between hardware and system application 124. Generally, the computer 100 operates under control of an operating system 122. The present invention is preferably implemented using one or more computer programs or applications 124, which are operated under the control of the operating system 122. The operating system 122 and computer program 124 may be loaded from a separate data storage device, such as floppy disk 114, into the memory 130 of the computer 100 for use during actual operations.

In an embodiment of the present invention, the operating system 122 and the computer program 124 are usable embodied in a computer-readable medium, e.g., data storage devices which could include one or more fixed or removable data storage devices, such as a floppy disk drive, hard drive, CD-ROM drive, tape drive, etc. Further, the operating system 122 and the computer program 124 are comprised of instructions which, when read and executed by the computer 100, causes the computer 100 to perform the steps necessary to implement and/or use the present invention. Those of ordinary skill in the art will recognize that many modifications may be made to this configuration, including the number, size, and types of components, without departing from the scope of the present invention.

In one embodiment, software instructions for identifying multimedia packets from data streams in the absence of announcement protocols and software instructions for prioritizing packets according to characteristics of data to be transferred over the link are used. In other embodiments, hardwired circuitry may be used in place of, or in combination with, software instructions to implement the present invention.

An embodiment of the present invention comprises a mechanism which enhances QOS for multimedia streams in communication networks over PPP links. The embodiment includes identifying multimedia streams, specifically AV packets, from the streams, and assigning each packet to one of a set of pre-defined priority classes, and associating the defined priority classes to the corresponding packets. The present invention can perform its function independent of the presence of announcement protocols.

Figure 2:
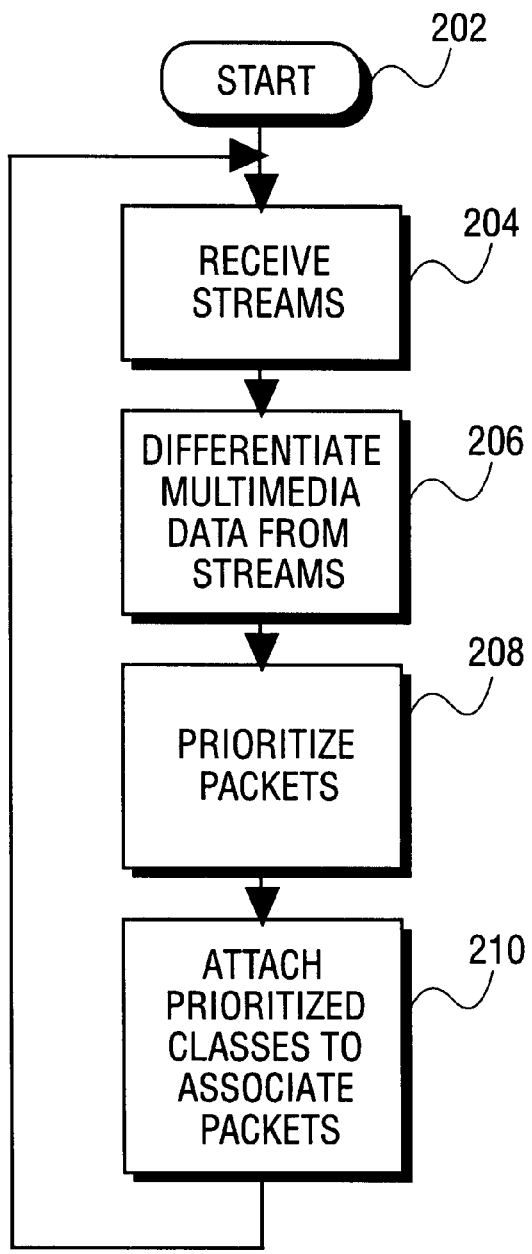
FIG. 2 illustrates a system in accordance with an embodiment of the present invention.

FIG. 2 illustrates a flow diagram of one embodiment of the present invention in accordance with showing the steps of receiving data streams, identifying packets, and prioritizing packets. The embodiment starts its process at block 202 and proceeds to block 204 to examine whether streams to be transmitted over the PPP links are properly received. If streams are properly received, the process proceeds from block 204 to the next block 206. At block 206, the process identifies packets from the streams and determines multimedia packets from non-multimedia packets. After block 206, the process proceeds to the next block 208 to prioritize identified packets according to the nature of contents of data to be transferred. After block 208, the process proceeds to block 210, where the process assigns each packet to one of predefined priority classes according to the contents of data that each packet carries. After block 210, the process loops back to block 202 and starts to process new data streams.

One embodiment of the present invention may use Real Time Framing ("RTF") which of it's a non-segmentation scheme. RTF does not split frames into smaller segments and instead it transmits entire frames over the link. RTF further allows frames to be interrupted at any point of time while a frame is being transferred to allow access of relatively low overhead due to the absence of a segmentation process while still achieving a greater degree real time link access.

Figure 3:
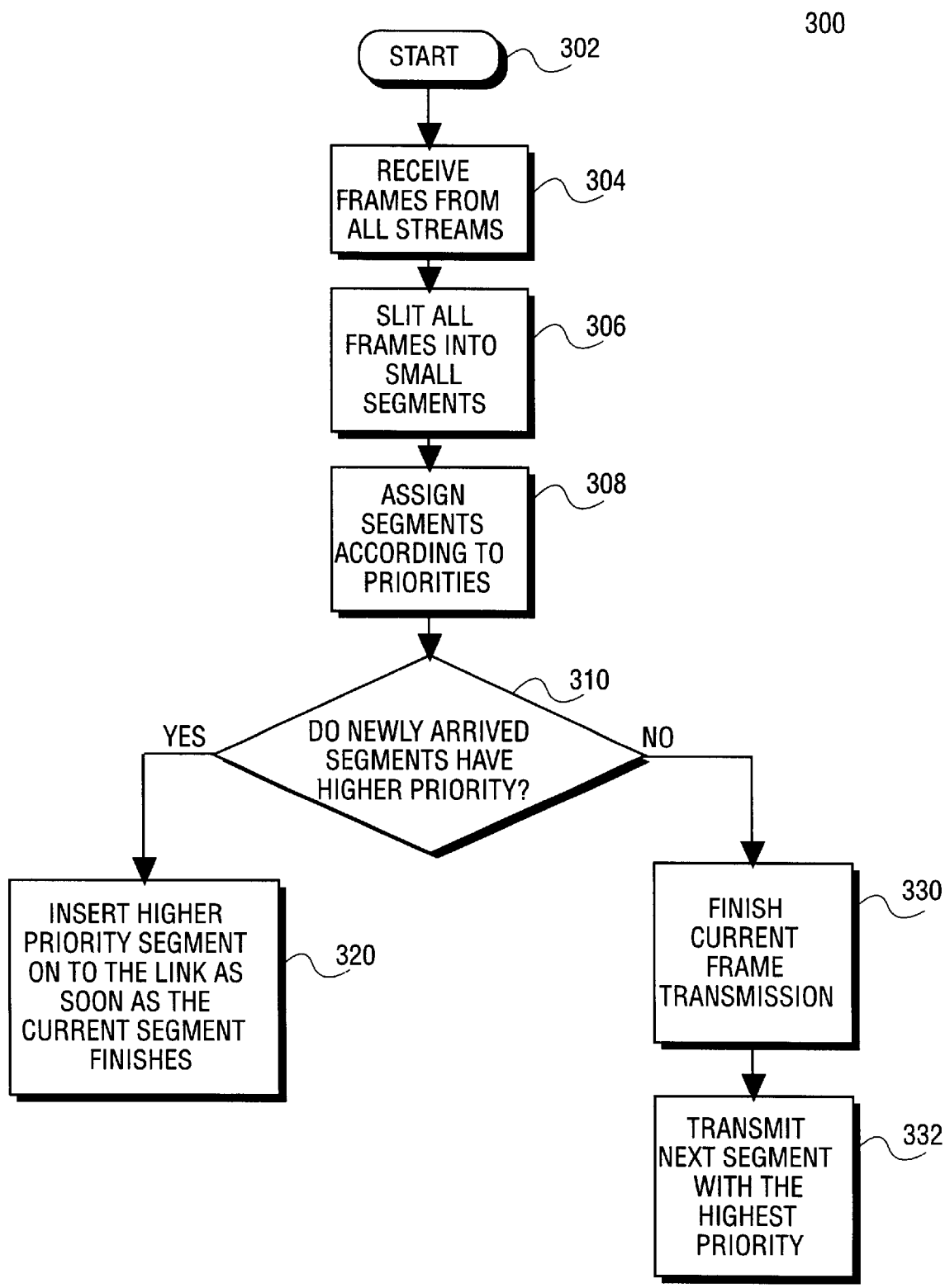
FIG. 3 illustrates a flow diagram of Multi-Channel Multi-Link PPP links in accordance with an embodiment of the present invention.

Another embodiment may use Multi-Channel Multi-Links PPP ("MCML") and it's segmentation scheme, which allows timely link access by higher priority classes. FIG. 3 illustrates a flow chart of MCML implementation. MCML starts its process at block 302 and proceeds to block 304 to examine whether streams to be transferred over the PPP link are properly received. After the streams have been received, the process leaves block 304 and proceeds to block 306 for segmentation. At block 306, the process splits frames into smaller segments, which may be packets. After block 306, the process proceeds to the next block 308 to assign each segment or packet to one of predefined priority classes.

Priority assignment of a segment or packet depends on the content of data that each segment or packet carries. For instance, a packet carrying audio data will be assigned to a higher priority over a packet carrying video data. After each segment or packet is assigned to a priority class, the process proceeds to the next block 310 to examine whether newly arrived segments or packets have higher priority classes than the priority classes of segments or packets that are currently being transmitted. If the newly arrived segments or packets have higher priority classes, the process proceeds from block 310 to block 320. At block 320, the process allows segments or packets with higher priority classes to access the link as soon as the current segment or packet finishes is being transported. If block 310 is false, which means that the newly arrived segment does not have higher priority classes, the process proceeds from block 310 to 330. At block 330, the current transmitting packets will be completed first and the process then proceeds to the next block 332 to transmit next segment or packet with the highest priority class that is pending to be transmitted. Accordingly, MCML allows the packets with higher priority classes to access the PPP link with only one segment transmission time delay.

Figure 4:
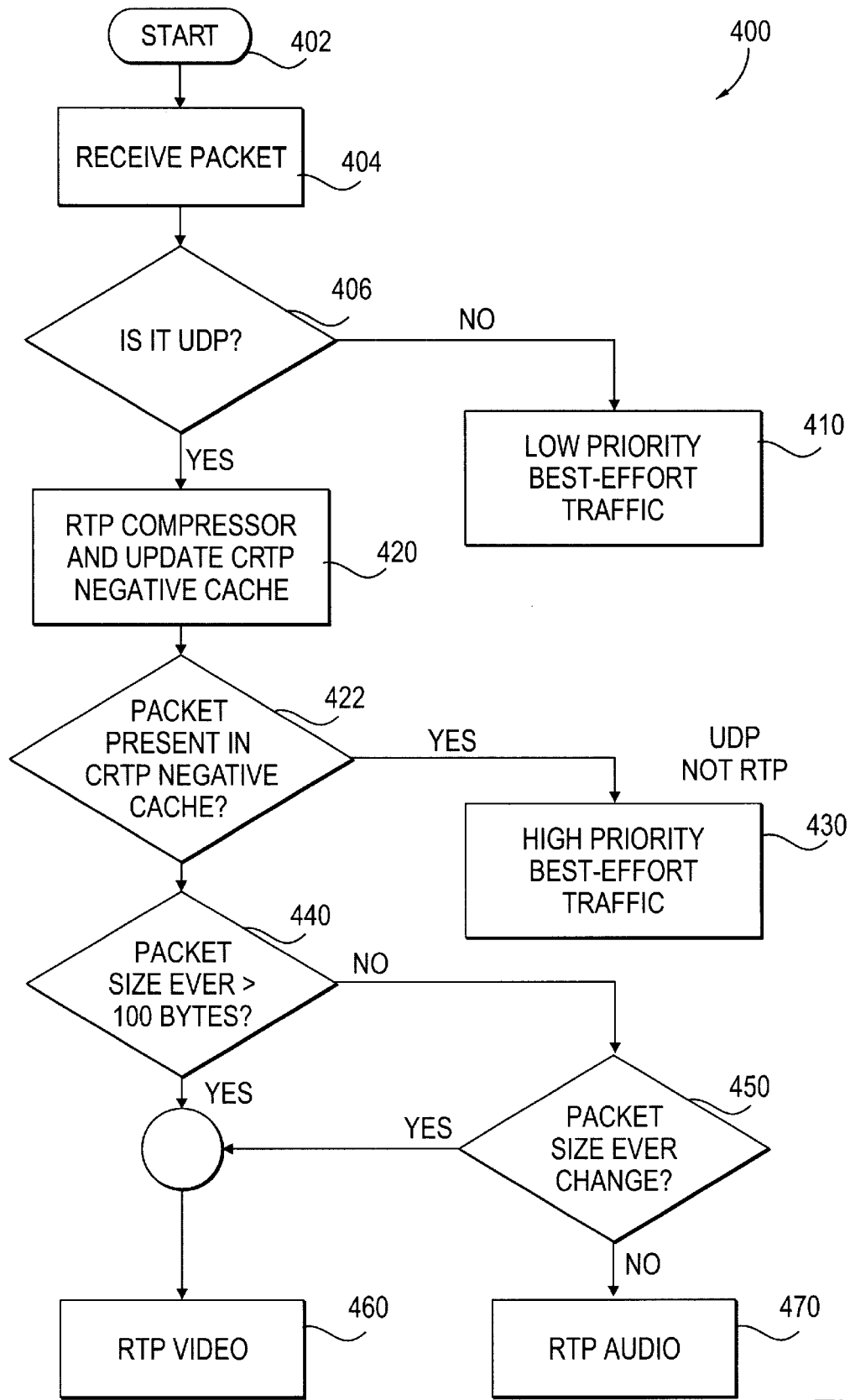
FIG. 4 illustrates a detailed system flow diagram in accordance with an embodiment of the present invention.

FIG. 4 illustrates an embodiment of the present invention in a flow diagram representation. The embodiment starts its process at block 402 and proceeds to block 404 to check whether a packet to be transmitted over the PPP link is properly received. After block 404, the process proceeds to the next block 406 to examine whether the received packet is UDP data. If block 406 is false, which means that the packet is not UDP data, the process proceeds from block 406 to block 410. At block 410, the process classifies the packet as lower priority with best effort traffic. If block 406 is true, which means that the packet is UDP data, the process proceeds from block 406 to block 420.

At block 420, the process uses a RTP compressor to process the packet to determine whether the packet is a RTP packet. See reference: H. Schulzrinne, S. Casner, R. Frederic, and V. Jacobson, "RTP: A Transport Protocol for Real-Time Applications", RFC 1889, January 1996. If the compression of the packet is successful, an RTP packet has been identified and the packet has been compressed. If the compression of the packet fails, it indicates that the packet is not a RTP packet and the process records this information in a CRTP negative cache to indicate that the packet is not a RTP packet. The CRTP negative cache is a cache memory that specifies packets that fail to be compressed by the RTP compressor. After block 420, the process moves to block 422 to check whether CRTP negative cache contains the information of the packet. If block 422 is true, which indicates that the packet is a non-RTP UDP packet, the process moves from block 422 to block 430. At block 430, the process classifies the packet as a higher priority with best effort traffic. If block 422 is not true, which indicates that a RTP packet has been found, the process proceeds from block 422 to block 440.

At block 440, the process examines whether the packet size is greater than 100 bytes. If block 440 is true, which indicates that the packet size is greater than 100 bytes, the process moves from block 440 to block 460. At block 460, the process classifies the packet as an RTP video packet. However, if the block 440 is false, which indicates that the packet size is smaller than 100 bytes, the process moves from block 440 to block 450.

At block 450, the process checks whether the size of packet has changed over the time. The process compares the packet size against the history of prior packet sizes. The history can be a list of previous packet sizes. An alternative to a list of previous packet sizes is the most recent packet size and a flag, which indicates whether the size of packet has changed. The flag is initially false, and is changed to true if a newly received packet from a stream varies in size from the previously received packet of the same stream. If block 450 is true, which means that the packet size has changed, the process proceeds to block 460, where the packet is classified as a RTP video packet. On the other hand, if block 450 is false, which means that the packet size has not changed, the process moves from block 450 to block 470. At block 470, the process classifies the packet as a RTP audio packet. Usually, the audio packets have higher priority class than the video packets and video packets have higher priority class than non-RTP UDP packets.

The following table 1 illustrates four pre-defined priority classes for audio, video, non-RTP UDP, and other packets.

TABLE 1

| | |
|---|---|
| Class 0 | It appears to be RTP audio. In order to be assigned to this class, the stream must consist of UDP packets that are less than 100 bytes in size and these packets must have successfully been compressed by the CRTP compressor (e.g., the stream must not appear in the CRTP negative cache). |
| Class 1 | It appears to be RTP video. This class will consist of any streams, which appear to be RTP (i.e., have been successfully compressed by CRTP), but they contain packets greater than 100 bytes or have variable packet size. |
| Class 2 | It appears to be UDP packets. Packets which have failed to compress in this class receive an enhanced quality of service over lower priority packets. |
| Class 3 | It appears to be other streams. This class is catchall category for those streams that do not fall into one of the other three classes stated above. This class is expected to mostly consist of TCP/IP packets being used for bulk data transfer such as FTP, WWW browsing, etc. |

Figure 5:
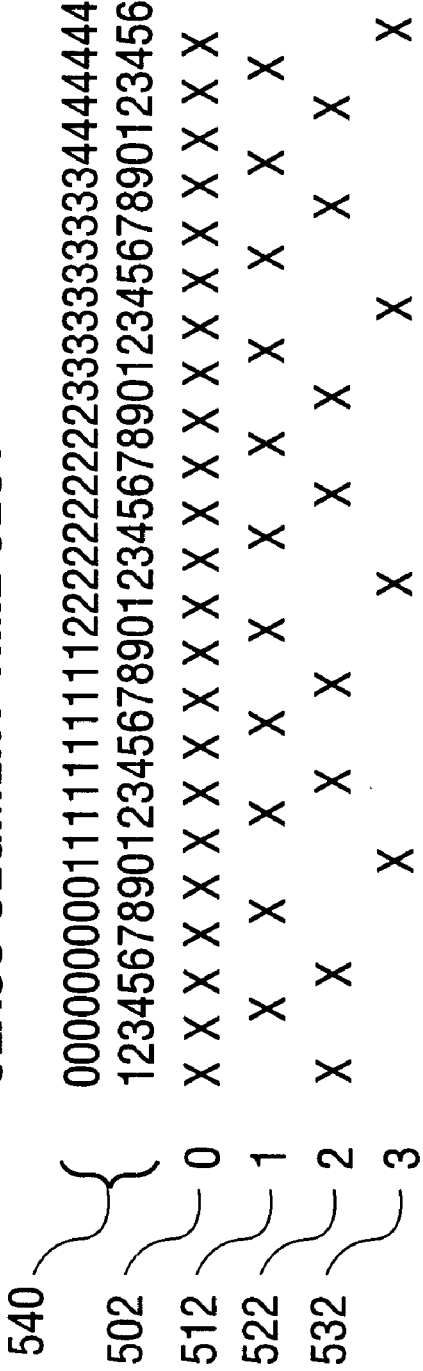
FIG. 5 illustrates an example of link priority scheduling in accordance with an embodiment of the present invention.

In order to deliver enhanced quality of service for classes 0, 1, 2, and 3, an absolute priority based scheme should be avoided. FIG. 5 illustrates an example of a method of assigning different types of packets to one of four predefined classes provided by MCML when using the short sequence number fragment format.

FIG. 5 demonstrates a possible configuration of link scheduling 500 for MCML using priority classes disclosed in Table 1. Link scheduling 500 is configured in such a way that every priority class has an opportunity to access the link, even if class 0 could consume all available bandwidth. Link scheduling 500 divides time line into equal length time slots 540. Each class occupies certain time slots 540. In this example, class 0 502 takes every other time slots to insure that class 0 can access the link in a timely fashion. Class 1 512 takes one of every four time slots. Class 2 and class 3 532 takes the remaining time slots 540. In this arrangement, every class has an opportunity to access the link without substantial delay for low priority classes.

Link scheduling 500 illustrated in FIG. 5 is an example of a weighted round robin scheme for scheduling priority classes. According to a weighted round robin scheme, packets or frames from each class are given access to the link using a periodic schedule. In other words, class 0 502 takes up fifty percent of the total time slots, and class 1 512 takes twenty percent of the time slots 540, and the remaining classes, class 2 522 and class 3 532 take up the remaining time slots 540. In this scheme, all classes have opportunities to access the links since class 0 502 is not allowed to occupy all available time slots 540. The link schedule 500 presented above was chosen under the assumption that packets from higher priority classes normally would not utilize all available time slots. The high number of time slots may be assigned to high priority classes is done in order to minimize jitter.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for prioritizing a data stream transmitted in an absence of an announcement protocol, the method comprising:
   selecting a packet from the data stream; determining whether the selected packet is a User Datagram Protocol (UDP) packet by examining a header of the packet;
   determining whether the packet is a Real Time Protocol (RIP) packet by using an RTP compressor on the packet;
   determining whether a size of the packet is larger than a threshold size;
   determining whether the size of the packet is consistent with other packets in the data stream; and
   prioritizing the data stream based on a combination of the determined UDP status, RTP status, packet size, and packet size consistency of the packet.

2. The method of claim 1, wherein prioritizing the data stream comprises:
   inferring that the data stream is low-priority data if the selected packet is not a UDP packet;
   inferring that the data steam is medium-priority data if the selected packet is a UDP packet but is not an RTP packet;
   inferring that the data-stream is high-priority RTP video data if the selected packet is an RTP packet, and the size of the selected packet is either larger than the threshold size or not consistent size with other packets in the data stream; and
   inferring that the data-stream is very-high-priority RTP audio data if the selected packet is an RTP packet, and the size of the selected packet is smaller than the threshold size and consistent with other packets in the data stream.

3. The method of claim 1, wherein determining whether the size of the packet is consistent with other packets in the data stream comprises:
   selecting a second packet from the data stream; and
   comparing the size of the selected packet to a size of the second packet.

4. The method of claim 3, further comprising:
   changing a flag when the size of the selected packet is not equal to the size of the second packet.

5. An apparatus for prioritizing a data stream transmitted in an absence of an announcement protocol, the apparatus comprising:
   means for selecting a packet from the data stream; determining whether the selected packet is a User Datagram Protocol (UDP) packet by examining a header of the packet;
   means for determining whether the packet is a Real Time Protocol (RTP) packet by using an RTP compressor on the packet;
   means for determining whether a size of the packet is larger than a threshold size;
   means for determining whether the size of the packet is consistent with other packets in the data stream; and
   means for prioritizing the data stream based on a combination of the output of the means for determining UDP status, RTP status, packet size, and packet size consistency of the packet.

6. The apparatus of claim 5, wherein prioritizing the data stream comprises:
   inferring that the data stream is low-priority data if the selected packet is not a UDP packet;
   inferring that the data steam is medium-priority data if the selected packet is a UDP packet but is not an RTP packet;
   inferring that the data-stream is high-priority RTP video data if the selected packet is an RTP packet, and the size of the selected packet is either larger than the threshold size or not consistent size with other packets in the data stream; and
   inferring that the data-stream is very-high-priority RTP audio data if the selected packet is an RTP packet, and the size of the selected packet is smaller than the threshold size and consistent with other packets in the data stream.

7. The apparatus of claim 5, wherein determining whether the size of the packet is consistent with other packets in the data stream comprises:
   selecting a second packet from the data stream; and
   comparing the size of the selected packet to a size of the second packet.

8. The apparatus of claim 7, further comprising:
   means for changing a flag when the size of the selected packet is not equal to the size of the second packet.

9. A system comprising:
   a processing control code; and
   an application interface coupled to the processing control code, the application interface to prioritize a data stream transmitted in an absence of an announcement protocol according to packet content by:
   electing a packet from the data stream;
   determining whether the selected packet is a User Datagram Protocol (UDP) packet by examining a header of the packet;
   determining whether the packet is a Real Time Protocol (RTP) packet by using an RTP compressor on the packet;
   determining whether a size of the packet is larger than a threshold size;
   determining whether the size of the packet is consistent with other packets in the data stream; and prioritizing the data stream based on a combination of the determined UDP status, RTP status, packet size, and packet size consistency of the packet.

10. The system of claim 9, wherein prioritizing the data stream comprises:
   inferring that the data stream is low-priority data if the selected packet is not a UDP packet;
   inferring that the data steam is medium-priority data if the selected packet is a UDP packet but is not an RTP packet;
   inferring that the data-stream is high-priority RTP video data if the selected packet is an RTP packet, and the size of the selected packet is either larger than the threshold size or not consistent size with other packets in the data stream; and
   inferring that the data-stream is very-high-priority RTP audio data if the selected packet is an RTP packet, and the size of the selected packet is smaller than the threshold size and consistent with other packets in the data stream.

11. The system of claim 9, wherein determining whether the size of the packet is consistent with other packets in the data stream comprises:
   selecting a second packet from the data stream; and
   comparing the size of the selected packet to a size of the second packet.

12. The system of claim 11, further comprising:
   changing a flag when the size of the selected packet is not equal to the size of the second packet.

13. A machine-readable medium storing data representing instructions that, when executed by a processor, cause the processor to perform operations for prioritizing a data stream transmitted in an absence of an announcement protocol, the operations comprising:
   selecting a packet from the data stream; determining whether the selected packet is a User Datagram Protocol (UDP) packet by examining a header of the packet;
   determining whether the packet is a Real Time Protocol (RTP) packet by using an RTP compressor on the packet;
   determining whether a size of the packet is larger than a threshold size;
   determining whether the size of the packet is consistent with other packets in the data stream; and
   prioritizing the data stream based on a combination of the determined UDP status, RTP status, packet size, and packet size consistency of the packet.

14. The machine-readable medium of claim 13, wherein prioritizing the data stream comprises:
   inferring that the data stream is low-priority data if the selected packet is not a UDP packet;
   inferring that the data steam is medium-priority data if the selected packet is a UDP packet but is not an RTP packet;
   inferring that the data-stream is high-priority RTP video data if the selected packet is an RTP packet, and the size of the selected packet is either larger than the threshold size or not consistent size with other packets in the data stream; and
   inferring that the data-stream is very-high-priority RTP audio data if the selected packet is an RTP packet, and the size of the selected packet is smaller than the threshold size and consistent with other packets in the data stream.

15. The machine-readable medium of claim 14, wherein determining whether the size of the packet is consistent with other packets in the data stream comprises:
   selecting a second packet from the data stream; and
   comparing the size of the selected packet to a size of the second packet.

16. The machine-readable medium of claim 15, wherein the instructions further cause the processor to perform an operations comprising changing a flag when the size of the selected packet is not equal to the size of the second packet.

* * * * *

UNITED STATES PATENT AND TRADEMARK OFFICE
CERTIFICATE OF CORRECTION

PATENT NO.     : 6,584,509 B2
DATED          : June 24, 2003
INVENTOR(S)    : Putzolu Page 1 of 1

It is certified that error appears in the above-identified patent and that said Letters Patent is hereby corrected as shown below:

<u>Column 4,</u>
Line 66, after "degree", insert -- of --.

Signed and Sealed this

Thirtieth Day of September, 2003

JAMES E. ROGAN
*Director of the United States Patent and Trademark Office*